(12) United States Patent
Pettygrove et al.

(10) Patent No.: US 12,196,867 B2
(45) Date of Patent: Jan. 14, 2025

(54) ANTENNA ALIGNMENT APPARATUS

(71) Applicant: Viavi Solutions Inc., San Jose, CA (US)

(72) Inventors: Scott Pettygrove, Leesburg, VA (US); Raleigh Benton Stelle, IV, Indianapolis, IN (US)

(73) Assignee: Viavi Solutions Inc., Chandler, AZ (US)

( * ) Notice: Subject to any disclaimer, the term of this patent is extended or adjusted under 35 U.S.C. 154(b) by 441 days.

(21) Appl. No.: 17/663,960

(22) Filed: May 18, 2022

(65) Prior Publication Data
US 2023/0112451 A1   Apr. 13, 2023

Related U.S. Application Data

(63) Continuation-in-part of application No. 17/500,521, filed on Oct. 13, 2021.

(51) Int. Cl.
*H01Q 3/08* (2006.01)
*G01S 19/53* (2010.01)

(52) U.S. Cl.
CPC ............... *G01S 19/53* (2013.01); *H01Q 3/08* (2013.01)

(58) Field of Classification Search
CPC .......... G01S 19/26; G01S 19/14; G01S 19/53; G01C 17/28; H01Q 3/04; H01Q 3/08; G01V 3/40
See application file for complete search history.

(56) References Cited

U.S. PATENT DOCUMENTS

| | | | | |
|---|---|---|---|---|
| 3,934,216 A | * | 1/1976 | Ward | H01F 7/0242 310/46 |
| 9,816,821 B2 | * | 11/2017 | Caballero | G01C 21/20 |
| 10,557,723 B2 | * | 2/2020 | Lee | G01D 5/145 |
| 2015/0054681 A1 | * | 2/2015 | Clifford | G01S 19/53 29/601 |
| 2019/0251402 A1 | * | 8/2019 | Godwin, IV | G06F 18/285 |

OTHER PUBLICATIONS

U.S. Appl. No. 17/500,521.

* cited by examiner

*Primary Examiner* — Awat M Salih
(74) *Attorney, Agent, or Firm* — DLA Piper LLP (US)

(57) ABSTRACT

An antenna alignment apparatus may include magnetic field sensors as an alternative to or in addition to GNSS sensors. The magnetic field sensors may measure the earth's magnetic fields at corresponding locations, and a processor may use the measurements to calculate at least one of a roll, tilt, or azimuth of an antenna. A declination based on GNSS based alignment and magnetic field sensor alignment may be stored for an adjustment of magnetic field sensor based azimuth calculations. For an optical alignment, the antenna alignment apparatus may, additionally or alternately, include a reference object (e.g., a printed mark or a physical stud) located within a field of view of a camera. A location of the reference object may indicate the alignment of the antenna vis-à-vis the structures within the field of view.

20 Claims, 8 Drawing Sheets

300

100

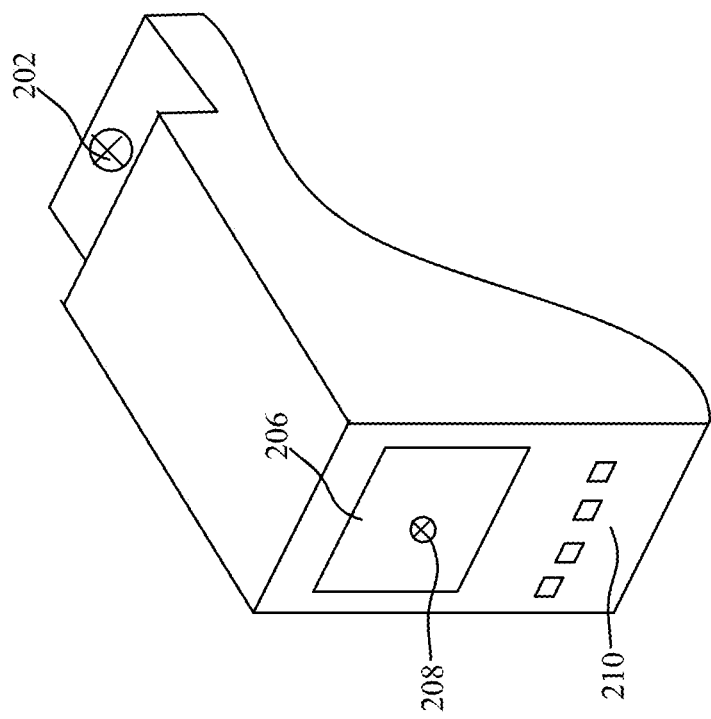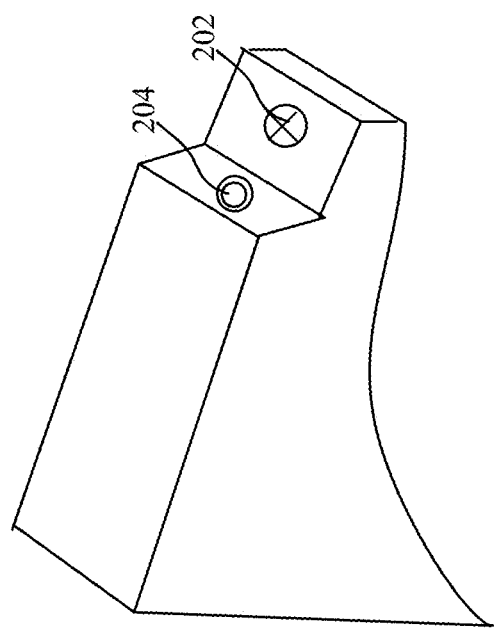
FIG. 2

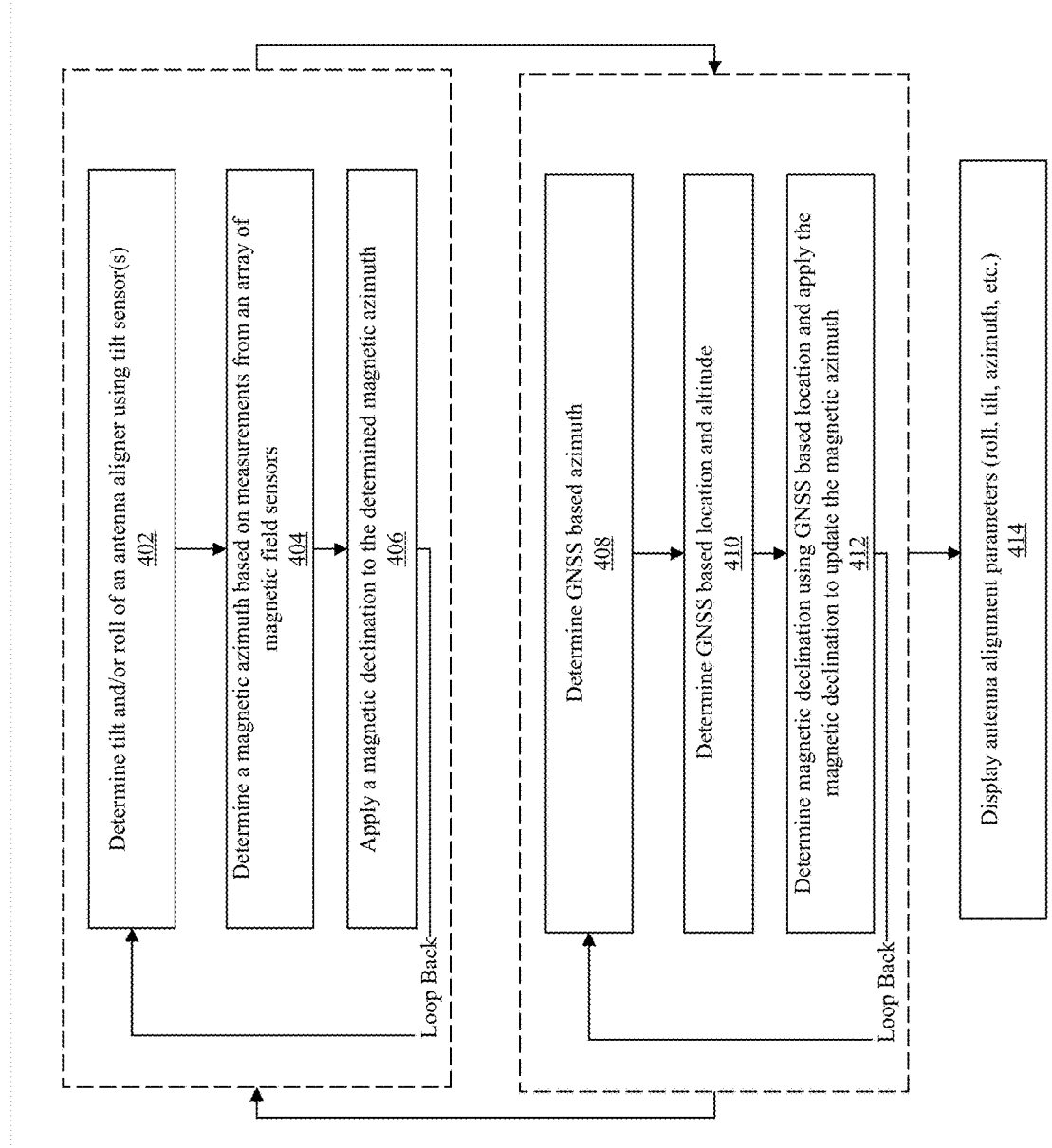

500b

ANTENNA ALIGNMENT APPARATUS

CROSS REFERENCE TO RELATED APPLICATIONS

This application is a continuation in part of U.S. patent application Ser. No. 17/500,521, filed Oct. 13, 2021, which has been incorporated by reference in its entirety.

BACKGROUND

Modern communication systems rely heavily on wireless signals. Wireless signals are transmitted and received by antennas. Antennas are physical devices that, on the transmit side, generate as wireless signals, electromagnetic fields corresponding to fluctuating electric currents received through wires from connected circuitry. On the receive side, antennas convert electromagnetic fields of the received wireless signals to electrical currents carried through wires to the connected circuitry. Because of directional oscillation of electrical and magnetic fields, wireless signaling through the transmittal and receipt of electromagnetic fields is inherently directional: heavily influenced by the location of the signal source, multipathing, beamforming, and/or other aspects associated with electromagnetic fields and electromagnetic radiation. Therefore, for an optimal bandwidth and signal strength, antennas—both on the transmit and receive sides—may require precise alignments with respect to each other.

Antenna alignments based on a global positioning system (GPS) have been widely used, but have several technical shortcomings. For instance, GPS receivers in the antennas have to be kept sufficiently apart to establish a known distance and position between two separate GPS satellites. This means that GPS-based alignment systems may be large and unwieldy, a major issue because these alignment systems have to be manually carried to inconvenient locations such as antenna towers. The GPS sensors and the supporting components also tend to be costly. The GPS sensors with the precision required for antenna alignment also consume a higher amount of power. Furthermore, the stability of the readings from the GPS sensors is influenced by uncontrollable factors such as weather and obstructions impeding the view of the GPS satellites. The wait for GPS lock is also large—often in other order of multiple minutes.

Antenna alignments based on field of view of an alignment device have also been used, but also have several technical shortcomings. In this type of alignment, a camera may be at the front of the alignment device, and an image captured by the camera may show user the "view" of the antenna that the alignment device is attached to. However, the shown view may not be precise: It may show a rough estimate that antenna is aligned towards the structures (e.g., a city block) in the camera view. However, the margin of error for this estimate may be large because it may be difficult to determine the precise orientation of the antenna vis-à-vis the structures shown in the camera view.

A significant improvement upon antenna alignment systems is therefore desired.

SUMMARY

Embodiments disclosed herein attempt to solve the aforementioned technical problems and may provide other solutions as well. An example antenna alignment apparatus (also referred to as antenna aligner or antenna alignment device) may include magnetic field sensors as an alternate to or in addition to Global Navigation Satellite System (GNSS) sensors, such as GPS sensors. The magnetic field sensors may measure the earth's magnetic fields at corresponding locations, and a processor may use the measurements to calculate an azimuth (e.g., geographical azimuth) of the antenna. For a more precise optical alignment, the antenna alignment apparatus may, additionally or alternately, include a reference object (e.g., a printed mark or a physical stud) located within a field of view of a camera. A location of the reference object may indicate the alignment of the antenna vis-à-vis the structures within the field of view. The location of the reference object may also allow a determination or verification of the antenna alignment performed by other sensors such as magnetic and GNSS sensors.

The antenna alignment apparatus may further store declinations between the magnetic azimuth calculated by the magnetic field sensors and the geographic azimuth calculated by the GNSS sensors. The stored declinations may be used by the antenna alignment apparatus to calculate geographic azimuth based on the measurements by the magnetic field sensors.

In an embodiment, an antenna alignment device configured to be coupled to an antenna is provided. The antenna alignment device includes one or more magnetic field sensors configured to measure the earth's magnetic fields at corresponding locations of the one or more magnetic field sensors and one or more global navigation satellite system (GNSS) antennas configured to receive signals from GNSS satellites, the GNSS antennas are further configured to calculate corresponding geolocations based on corresponding received signals. The antenna alignment device further includes a processor configured to determine a magnetic azimuth of the antenna based on the measured earth's magnetic field by at least one magnetic field sensor of the one or more magnetic field sensors; determine a geographic azimuth of the antenna based on the corresponding geolocations; determine a declination between the magnetic azimuth and the geographic azimuth; and a non-transitory storage medium configured to store the determined declination.

In another embodiment, an antenna alignment method is provided. The method includes measuring, by one or more magnetic field sensors of an antenna alignment device, the earth's magnetic fields at corresponding locations of the one or more magnetic field sensors; and receiving, by one or more global navigation satellite system (GNSS) antennas of the antenna alignment device, signals from GNSS satellites, the GNSS antennas further calculates corresponding geolocations based on corresponding received signals. The method further includes determining, by a processor of the antenna alignment device: a magnetic azimuth of the antenna based on the measured earth's magnetic field by at least one magnetic field sensor of the one or more magnetic field sensors; a geographic azimuth of the antenna based on the corresponding geolocations; a declination between the magnetic azimuth and the geographic azimuth; and storing, via a non-transitory storage medium of the antenna alignment device, the determined declination.

BRIEF DESCRIPTION OF THE DRAWINGS

FIG. 2 shows perspective views of an example antenna aligner, based on the principles disclosed herein.

FIG. 4 is a flow diagram of an example method of calculating antenna alignment parameters, based on the principles disclosed herein.

DETAILED DESCRIPTION OF SEVERAL EMBODIMENTS

Figure 1:
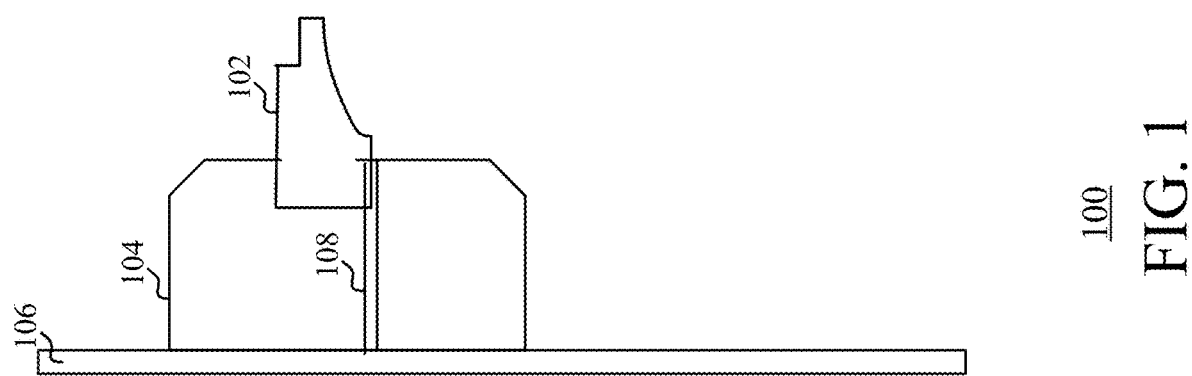
FIG. 1 shows an example environment for an antenna aligner, based on the principles disclosed herein.

Embodiments disclosed herein describe apparatuses, systems, and methods for aligning antennas. An antenna aligner may use multiple sensors and/or a camera with a reference object for a faster, more reliable, and more precise antenna alignment compared to the conventional antenna aligners. A processor may use the data from the multiple sensors to determine at least one of a roll, tilt, or azimuth of the antenna that the antenna aligner is coupled to. A location of the reference object in the field of view of the camera may be used to align the antenna with respect to the other objects in the field of view.

The sensors may include, but are not limited to, magnetic field sensors, GNSS antennas, GNSS receivers, inertial motion sensors, or tilt sensors such as accelerometers. The magnetic field sensors may measure the earth's magnetic field at corresponding locations. Based on these measurements, which may be directional as magnetic fields are vector quantities, a processor may determine an azimuth) of the antenna. The processor may determine other alignment information, e.g., roll or tilt, based on measurements from other sensors such as inertial motion sensors or accelerometers. In an embodiment, the magnetic field sensors may be within a reference plane. For instance, a printed circuit board (PCB) in the antenna aligner may have multiple magnetic field sensors, and the PCB may be mounted in a known reference plane relative to the antenna aligner. The processor may use this reference plane to potentially mitigate a localized magnetic field effect influencing the magnetic field sensors. For instance, the reference plane may allow the magnetic field sensors to measure the same or similar vector directions (e.g., relative to the reference plane) of the earth's magnetic field. An outlier measurement, where at least one vector direction is substantially different, may be discarded from the final measurement. Although the aforementioned sensors are recited in plural, a single sensor (e.g., one magnetic field sensor) may be used to achieve same or similar functionality.

The inertial motion sensors and tilt sensors such as accelerometers may be used to select a portion of the data measured by the magnetic field sensors. The view of, and therefore the measurement made by the magnetic field sensors, may be three dimensional (e.g., for each magnetic field sensor, forming a sphere with the sensor in the middle, wherein each point in the sphere may have the same magnetic field intensity). The roll and the tilt data may then be used to select a portion of the sphere (e.g., a two-dimensional circular slice). The azimuth of the antenna may then be determined using the selected data for each magnetic field sensors.

The magnetic azimuth calculated based on the measurements from the magnetic field sensors (or one magnetic field sensor) may not necessarily be the geographical azimuth because of the non-alignment of the earth's magnetic and geographical poles. Therefore, the magnetic azimuth calculation may have to be augmented (or corrected) to account for the non-alignment. For instance, the antenna aligner may have pre-stored data with corrections to determine the geographical azimuth from the magnetic azimuths (e.g., offsets for magnetic azimuth calculations). In other instances, the user may provide the correction data. Furthermore, GNSS based location determination may be used to retrieve the correction data corresponding to the determined location.

The GNSS antennas (not to be confused with the antenna being aligned) and or receivers may provide additional data for alignment. In an embodiment, azimuth calculations from the magnetic field sensors may be used until there a GNSS lock (e.g., determination of a geoposition within a desired confidence level). Once there is a GNSS lock, the aligner may switch the azimuth determination based on the GNSS antenna/receiver data. When the lock is lost, the aligner may switch to the magnetic field sensors. The antenna aligner may also operate using a "hybrid" approach, determining alignment based on both the magnetic field sensor data and GNSS antenna/receiver data. Both types of measurements may be used for the azimuth calculation. For instance, GNSS based location may be used to determine the correction to generate a geographical azimuth from the magnetic azimuth calculated by the magnetic field sensors.

The antenna aligner may further indicate to the user what type of measurement was used for azimuth calculation. For example, the antenna aligner may indicate, at a display, that magnetic field sensors were used to calculate the azimuth, that GNSS antennas/receivers were used to calculate the azimuth, or that a hybrid approach was used to calculate the azimuth using both magnetic field sensors and the GNSS antennas/receivers.

The declination correction between the magnetic azimuth (as calculated using magnetic field sensors) and geographic azimuth (as calculated using GNSS antennas) may be stored by the antenna alignment apparatus. For example, the antenna alignment apparatus may calculate the GNSS-based geographic azimuth when it is able to communicate with a desired number of GNSS satellites (i.e., when the antenna alignment apparatus can "see the sky"). The geographic azimuth may be compared with the magnetic azimuth to determine the declination between the two azimuths. The determined azimuth may be stored along with associated information such as time of calculating the geographical azimuth, latitude and longitude of the antenna alignment apparatus when the geographic azimuth was calculated, etc. When the antenna alignment apparatus are not be able to communicate with the desired number of GNSS satellites (i.e., unable to see the sky), the stored declination may be applied to the magnetic azimuth to generate the azimuth. This application overcomes the conventionally techniques of manually entering the declination.

The reference object in the field of view of the camera may be used for optical alignment. An image of the reference object may be shown in a display together with other physical objects (e.g., a city block) in the field of view of the camera. The distance between the camera and the reference object and/or the orientation of the reference object vis-à-vis the camera (e.g., an angle between a line perpendicular to the field of view of the camera and the reference object) may be predetermined, and the predetermined distance and/or orientation may be used to determined how the antenna is aligned to the other objects in the field of view. For instance, a user may manually adjust the antenna until the reference object is in a straight line with another object in the field of view (e.g., center of a building rooftop).

Further details of example embodiments are described below with references to FIGS. 1-5D.

FIG. 1 shows an example environment 100 for an antenna alignment apparatus (also referred to as an antenna aligner), based on the principles disclosed herein. The example environment 100 includes an antenna 104. The antenna 104 may be disposed on a pole 106. The pole 106 is just an example, and the antenna 104 may be located on any type of structure such as an antenna tower, rooftop, treetop, building wall, vehicle top, satellite, and/or any other type of structure. Furthermore, the antenna 104 can be any type of antenna, including a dome antenna, loop antenna, Yagi-type antenna, and/or any type of antenna that may have to be aligned for optimal performance. Although the antenna 104 is described herein as a singular antenna, a combination of antennas that may have to be aligned should also be considered within the scope of this disclosure.

An antenna aligner 102 may be attached to the antenna 104 using a clamp 108. The clamp 108 is just an example, and any kind of coupling or connecting device should be considered within the scope of this disclosure. The antenna aligner 102 may include any type of sensors, displays, and/or other components configured to align the antenna 104. When coupled to the antenna 104, the orientation of the antenna aligner 102 may correspond to the orientation of the antenna 104. In other words, the alignment of the antenna 104 may correspond to the alignment of the antenna aligner 102 itself. The alignment may include parameters such as roll, pitch, or azimuth; as understood in the art.

In operation, the antenna aligner 102 may be coupled to the antenna 104. The antenna aligner 102 may display the alignment information in a display or transmit the alignment information to another device (e.g., a nearby smartphone). As the antenna 104 is adjusted, the antenna aligner 102 may provide real time feedback of the alignment information. In some embodiments, the antenna aligner 102 may allow the user to input the desired alignment. When the desired alignment (or an alignment within a margin of error of the desired alignment)) is reached, the antenna aligner 102 may provide a visual and/or audio feedback. The video feedback may include, for example, an indication in the display or a LED (Light Emitting Diode) light being green. The audio feedback may include, for example, a sound indicating that the desired alignment has been reached.

FIG. 2 shows perspective views of an example antenna aligner 102, based on the principles disclosed herein. More particularly, FIG. 2 shows perspective views of an external form factor of the antenna aligner 102. The external form factor generally shows optical components for the antenna aligner 102. It should however be understood that other sensors (e.g., magnetic field sensors) may be disposed in the external form factor of the antenna aligner 102. As shown, the optical components may include, for example, a camera 204, a reference object 202, a display 206, and a control panel 210.

The camera 204 may be any kind of camera, including but not limited to optical camera, infrared camera, and/or any other type of sensor that may capture any type of electromagnetic waves to generate an image of objects in the field of view of the camera 204. For instance, the field of view of the camera 204 may include buildings within a city block; and the field of view may indicate that the front portion of the antenna 104 is aligned towards the city block. However, the view by itself may be able to only provide just a rough alignment (i.e., the antenna 104 is generally alignment towards the city block), but not a precise alignment as desired.

The reference object 202 may be any kind of mark, stud, and/or any other type of component that is within the filed of view of the camera 204. For instance, the reference object 202 may be a printed mark that is visible in any type of image captured by the camera 204. The printed mark may include a symbol, text, log, insignia, and/or any type of print on the material surface of the antenna aligner 102. In other instance, the reference object 202 may be a physical stud, such as a physical protrusion or other kind of physical landmark in the surface of the antenna aligner. The physical stud, which may be visible in the field of view of the camera 204, may be any shape or size.

The display 206 may render the field of view of the camera 204. For instance, the display may show an image captured by the camera 204. Within the image captured by the camera, the display may show an image 208 of the reference object 202. The location of the image 208 of the reference object 202 may provide a more precise alignment of the antenna.

In some embodiments, the antenna 104 may be manually adjusted until the image 208 is aligned with a physical landmark (e.g., a centerline through a roof of a building in the display 206). For example, the antenna 104 may be rotated, turned, or linearly moved until the image 208 is in a straight line perpendicular to the surface of the display 206.

In other embodiments, computer vision may be used to calculate alignment based on the location of the image 208 within the display 206. More particularly, the computer vision may detect the location of the image 208 (e.g., based on the reference object 202 being known the computer vision). The computer vision may further detect locations of other physical objects within the display 206. The other physical objects may include buildings, trees, roads, or other antennas. Based on the location of the image 208 and the location of the other objects, the computer vision may determine the alignment of the of the antenna aligner 102 and thereby the alignment of the antenna 104. The computer vision program instructions may be executed by the processor of the antenna aligner and/or other external processors (e.g., a processor of a smartphone) based on the information transmitted by the antenna aligner 102.

The control panel 210 may allow configuration of the antenna aligner 102. For instance, the control panel 210 may include buttons that may allow a user to configure various settings, e.g., indicate a desired alignment for the antenna 104, control zoom level of the display 206, control the communications between the antenna aligner 102 with other external devices, and/or other settings.

In operation, the antenna aligner 102 may be clamped (or otherwise connected) to the antenna 104. The adjusting motions of the antenna 104 may be imparted to the antenna aligner 102 based on the clamping. Based on the parameters measured by the antenna aligner (e.g., location of the image 208 in the display 206 vis-à-vis a location of a known structure), an alignment determination of the antenna 104 may be made.

Figure 3:
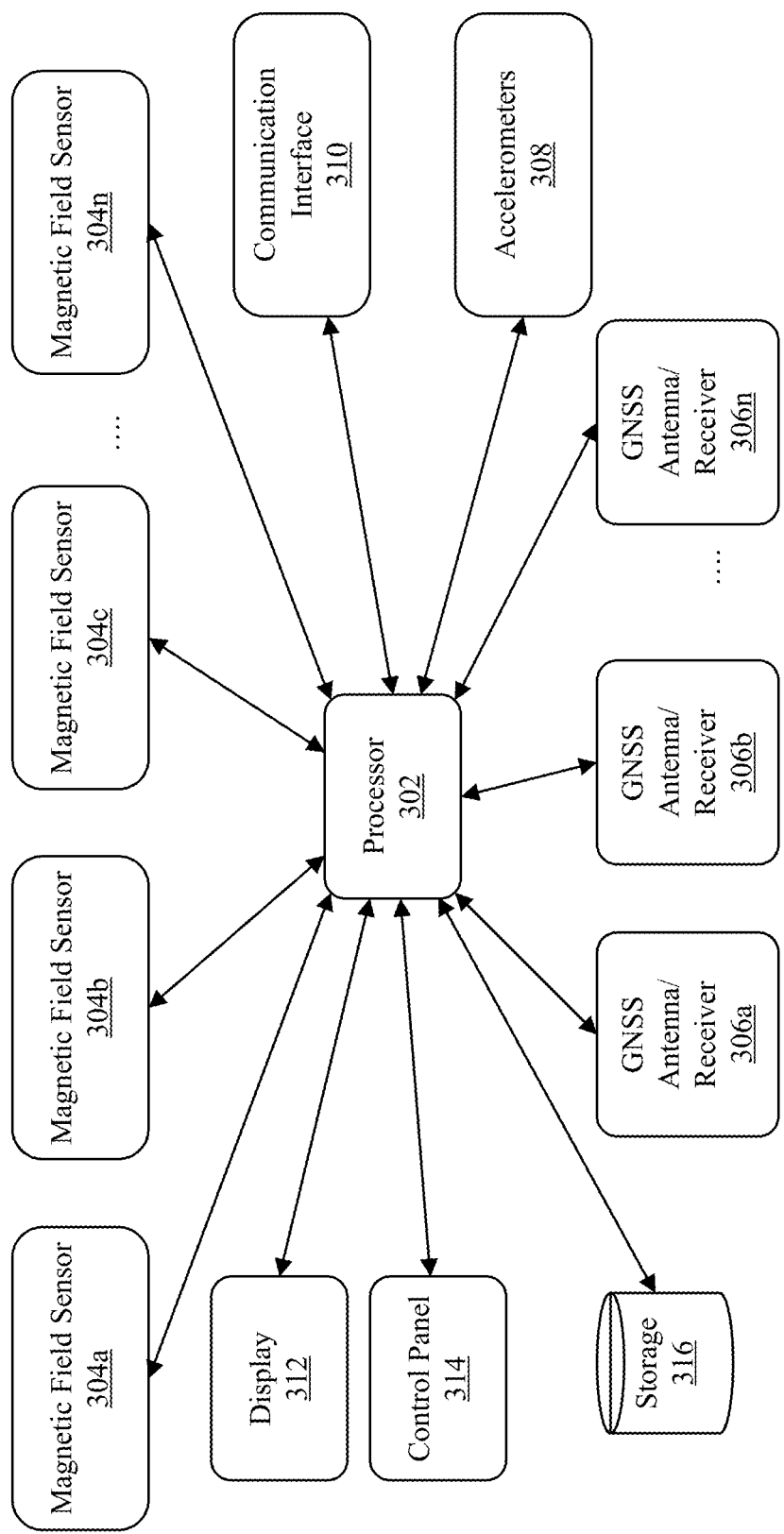
FIG. 3 shows an example architecture of an antenna aligner, based on the principles disclosed herein.

FIG. 3 shows an example architecture 300 of an antenna aligner (e.g., antenna aligner 102 shown in FIGS. 1-2), based on the principles disclosed herein. As shown in the architecture 300, the antenna aligner may comprise components such as a processor 302, magnetic field sensors 304a-304n (collectively or commonly referred to as sensors 304), GNSS antennas/receivers 306a-306n (collectively or commonly referred to as antennas/receivers 306), accelerometers 308, a communication interface 310, a display 312, a control panel 314, and a storage device 316. It should be understood that these components are shown and described as mere examples; and antenna aligners with additional, alternate, and fewer number of components should also be considered within the scope of this disclosure. For instance, in addition to the specific sensors described, the antenna aligner may have additional sensors, e.g., optical cameras or infrared cameras; an example camera 204 is shown in FIG. 2.

The processor 302 may include any kind of processing components that may receive data from the other components, perform calculations on the received data, and provide a response (e.g., a control signal to the components or a communication signal to other devices) based on the calculations. The processor 302 may also control the overall operation of the antenna aligner. Examples of the processor 302 may include controllers, microprocessors, discrete logical components, and/or any type of components configured to perform processing operations described herein. The processor 302 may be coupled to a non-transitory computer readable medium/memory (not shown) that may store computer program instructions that the processor 302 may execute to cause the functionality described herein. Although the example processor 302 is shown as a single component, it should be understood the processor 302 may include multiple components, such as multiple processors. It should be further understood that a portion of the processing operations may occur outside the antenna aligner.

The magnetic field sensors 304 may include any type of sensor that may measure the earth's magnetic field at a corresponding location. The magnetic field sensors 304 may use any kind of measuring technology such as Hall effect. The measuring technology may further include measuring effects of the earth's magnetic field on resistance and/or on an electric current moving through a circuit. Regardless of the measurement technology, the magnetic sensors 304 may generate a vector measurement of the earth's magnetic field. The vector measurement may be in a Cartesian system, with the X direction being parallel to earth's magnetic north-south axis, the Y-direction being in the earth's east-west axis, and the Z-direction being perpendicular to the plane of the surface of the earth. The measured earth's magnetic field vector B may therefore have corresponding intensities in each of the above three directions. The scalar magnitude of this vector measurement (i.e. square root of $(X^2+Y^2+Z^2)$, which may be measured in Gauss or Tesla, may be referred to as total intensity of the magnetic field vector B. Other parameters such as inclination and inclination, may be calculated through the orthogonal X, Y, Z components of the field vector B. The magnetic field sensors 304 may provide these measurements to the processor 302. Although multiple magnetic field sensors 304 are shown in FIG. 3 and described herein, architectures with a single magnetic field sensor 304 should also be considered within the scope of this disclosure.

The processor 302 may calculate the average of the measurements to determine, e.g., azimuth of the antenna. The azimuth may indicate the orientation of the antenna in relation to the magnetic axis (e.g., magnetic north and south) of the earth. The processor 302 may then offset the azimuth calculation using predetermined values to calculate the azimuth of the antenna with respect to the geographic axis of the earth. The predetermined values may be stored in the memory coupled to the processor as a lookup table as magnetic azimuth-geographic azimuth pairs.

In some embodiments, multiple magnetic field sensors (e.g., at least three magnetic field sensors) 304 arranged in a reference plane may be used. These magnetic field sensors 304 may be arranged, for example, within a PCB of a known plane with reference to the antenna aligner. In other examples, the magnetic field sensors 304 may be in different parallel planes. Orientations of the established reference plane with, for example, the earth's surface may be used to calculate the azimuth of the antenna. It should however be understood that the plane formed by three magnetic sensors is merely an example and any number of sensors may be used within the antenna aligner.

The GNSS antennas/receivers 306 may communicate with GNSS satellites to calculate the corresponding positions of the GNSS antennas/receivers 306. More particularly, the GNSS antennas/receivers 306 may receive GNSS signals broadcasted by the GNSS satellites, and use the attributes of the signal (e.g., time of the broadcast embedded in the GNSS signals) to geolocate themselves. Geolocating may include determining latitude, longitude, altitude, and/or other attributes associated with determining the corresponding geolocations. When multiple GNSS antennas/receivers 306 determine their geolocations, the processor 302 may use these geolocations to determine positional parameters of the antenna aligner, such as its azimuth. In some embodiments, the processor 302 may use the geolocations as a redundancy check on the calculated alignment parameters (e.g., azimuth). In other embodiments, the processor 302 may perform a "hybrid" calculation using the data from both the magnetic field sensors 304 and GNSS antennas/receivers 306. Particularly, the GNSS antennas/receivers 306 based alignment may be compared against magnetic field sensors 304 based alignment to calculate and store a declination. The declination may be used to adjust magnetic field sensors 304 based alignment when GNSS antennas/receivers 306 may not be available.

The accelerometers 308 may include any type of accelerometer that may be used to detect the orientation of the antenna (e.g., based on the orientation of the antenna aligner) with respect to the earth's surface. For instance, multiple accelerometers 308 may measure the direction of gravitational pull at corresponding locations, and, based on comparing the directions, may detect the orientation of the antenna. The orientation may include, for example, roll and tilt of the antenna. In some embodiments, the processor 302 may use the orientation determined by the accelerometers 308 to perform the azimuth calculations. For instance, the processor 302 may select, for a three dimensional (e.g., spherical) magnetic field measured by a magnetic field sensor, a two-dimensional circular slice. The magnetic azimuth is then determined based on the selected portion of the three-dimensional measurement. It should be noted that that accelerometers 308 are described just as examples and any kind of inertial motion sensor and/or tilt sensor should be considered within the scope of this disclosure.

This alignment information generated by the antenna aligner may be used by a user to physically adjust the antenna until the desired alignment is reached. To that end, the alignment information may be calculated in real time during the adjustment, providing a real-time feedback to the user. When the antenna falls within a desired range (e.g., within a margin of error of an alignment target), the antenna aligner may provide a visual or audio feedback. The visual feedback may be within a display or through LEDs. The audio feedback may be an audible tone or a message.

The communication interface 310 may use any type of communication technology to facilitate the communication between the antenna aligner and external devices. For instance, the communication interface 310 may provide a port (e.g., an Ethernet port) for wired data communication between the antenna aligner and the external devices. In addition or alternatively, the communication interface 310 may comprise a wireless communication components for supporting protocols such as Bluetooth, Wi-Fi, and/or Zigbee. The external devices that the communication interface 310 may be used to communicate may include mobile devices (e.g., smartphones or tablets) being carried by a user performing the alignment. The external devices may further include other types of computers and servers that the antenna aligner may transmit to and receive from.

The display 312 may be any kind of display, such as an LCD (Liquid Crystal Display) or LED (Light Emitting Diode) display. The display may be touchscreen and provide the user with configurable parameters (e.g., rendered as options in a graphical user interface) that may be used for customizing the functionality of the antenna aligner. The display 312 may further show the view of a camera of the of antenna aligner. The view may be used by the user to determine a proper alignment of the antenna.

The control panel 314 may comprise buttons, dials, capacitive touch screens, and/or any other type of input components used to configure the functionality of the antenna aligner. For instance, the control panel 314 may be used to calibrate the antenna aligner, start a communication between the antenna aligner and an external device, configure the display 312 (e.g., by changing the zoom level), and/or change any other functionality of the antenna aligner.

The storage device 316 may include any type of storage technology. For example, the storage device 316 may include random access memory (RAM), read only memory (ROM), solid state drive, hard drives, and or any other type of storage technology. The storage device 316 may store one or more declinations calculated by the processor 302 based on the GNSS antennas/receivers 306 based alignment and magnetic field sensors 304 based alignment. A declination may be stored in association with a time stamp of its calculation. The declination may further be stored in association with a location (e.g., latitude and longitude) of its calculation.

FIG. 4 is a flow diagram of an example method 400 of calculating antenna alignment parameters, based on the principles disclosed herein. The steps of the method may be performed by an antenna aligner (e.g., antenna aligner 102 shown in FIGS. 1-2) and/or other computing devices (e.g., a smartphone) in conjunction with the antenna aligner. The steps shown in FIG. 4 and described herein are merely examples and methods with additional, alternate, or fewer number of steps should also be considered within the scope of this disclosure.

The method 400 may begin at step 402, wherein a tilt and/or roll of an antenna aligner is determined using one or more tilt sensors. For instance, an accelerometer may be used to determine a roll and a tilt of the antenna aligner. At step 404 a magnetic azimuth of the antenna aligner may be determined based on measurements from an array of magnetic field sensors (or a single magnetic field sensor). The magnetic field sensors may be fall in a same reference plane (e.g., by being in a same PCB) or multiple parallel reference planes (e.g., by being in multiple, parallel PCBs). At step 406, a magnetic declination may be applied to the determined magnetic azimuth. The magnetic declination may adjust the magnetic azimuth to correspond with the geographic azimuth. The magnetic declination may be previously stored in the magnetic aligner and/or in one or more other devices. Alternatively, the magnetic declination may be provided by the user. Steps 402-406 may continue in the background to always provide a magnetic field-based azimuth. Furthermore, steps 402-406 may operate in tandem with steps 408-412 for GNSS based azimuth determination or a GNSS based azimuth determination and/or correction of the magnetic field sensors based azimuth determined in steps 402-406.

At step 408, GNSS based azimuth of the antenna aligner may be determined. If the determination is successful, the GNSS based azimuth may be used instead of the magnetic sensor based azimuth (also referred to as magnetic azimuth). If the determination is unsuccessful, GNSS based location and altitude may be determined at step 410. The GNSS based location may be used at step 412 to determine a magnetic declination for the location (e.g., correction to be applied to magnetic azimuth to generate the geographical azimuth) and the declination may be applied to the magnetic azimuth determined in steps 402-406. In other words, the GNSS based location may be used to generate the geographical azimuth from the magnetic azimuth as an alternative to or in addition to pre-stored/user provided magnetic declination of step 406.

At step 414, antenna alignment parameters may be displayed. The antenna alignment parameters may include, for example, roll and tilt of the antenna (e.g., based on measurements from tilt sensor(s), azimuth of the antenna (e.g., as measured be the magnetic field sensors and/or GNSS sensors), etc. The parameters may be displayed on the antenna aligner itself and/or other computing devices such as smartphones.

Therefore, the hybrid magnetic sensor-GNSS based antenna alignment using the method 400 may be applied to a plurality of circumstances. For example, a GNSS-based geographical azimuth may be calculated when the antenna aligner can "see the sky"—i.e., communicate with a desired number of GNSS satellites to geolocate one or more GNSS antennas/receivers. This geographical azimuth may be compared against a magnetic azimuth calculated by the magnetic field sensor to determine a declination (also referred to as magnetic declination) between the geographic azimuth and the magnetic azimuth. The declination may be stored in a memory of the antenna aligner. When the GNSS based azimuth calculation is not available (e.g., no clear view of the sky, inability to communicate with GNSS satellites), the magnetic field sensor-based azimuth may be calculated and the declination may be applied to the magnetic field sensor based azimuth to calculate the geographic azimuth.

Multiple declinations may be calculated and stored based on the availability of GNSS based geolocations. For example, multiple declinations for a same location may be calculated across time and the declinations may be stored in association with corresponding time stamps. To determine a geographic azimuth, the most recent declination may be applied to a calculated magnetic azimuth. In some instances, the antenna aligner may not be confined at a same location. Multiple declinations may be calculated for multiple locations (e.g., as indicated by latitudes and longitudes of the locations). The antenna aligner may retrieve the declination corresponding to the current location (e.g., current latitude and longitude) and apply the same to the magnetic azimuth.

FIGS. 5A-5D show example interfaces aiding antenna alignment, based on the principles disclosed herein. The interfaces may be displayed by an antenna aligner (e.g., antenna aligner 102 shown in FIGS. 1-2). It should however be understood that the shown interfaces are merely examples and other interfaces should also be considered within the scope of this disclosure.

Figure 5A:
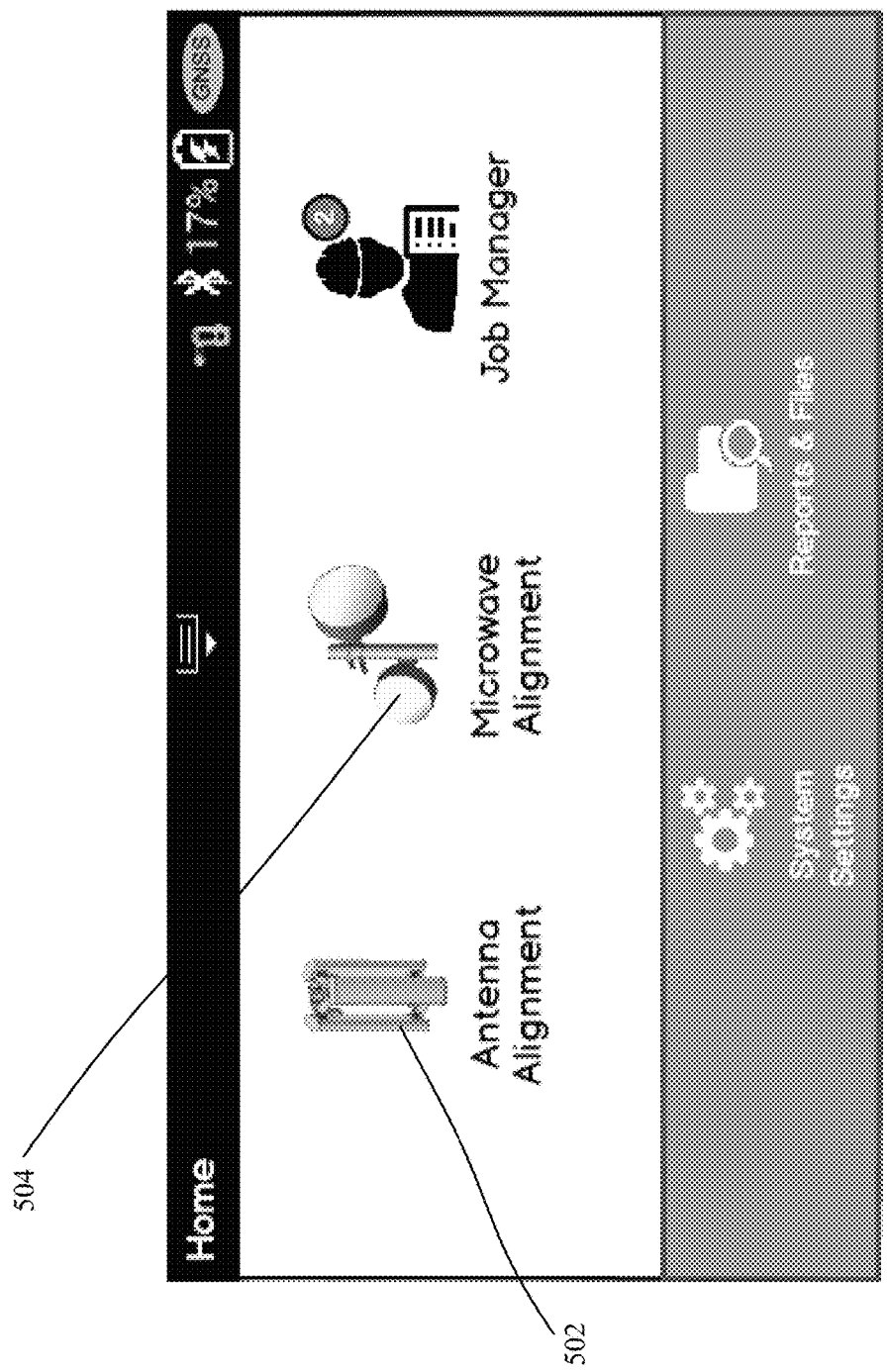
FIGS. 5A-5D show example interfaces aiding antenna alignment, based on the principles disclosed herein.

FIG. 5A shows a first interface 500a, which may be an initial interface to allow a user to select various modes of alignment. As shown, the user may be select an antenna alignment mode using an antenna alignment icon 502 or a microwave alignment mode using the microwave alignment icon 504. The principles disclosed herein may be applicable to each of the antenna alignment mode and the microwave alignment mode.

Figure 5B:
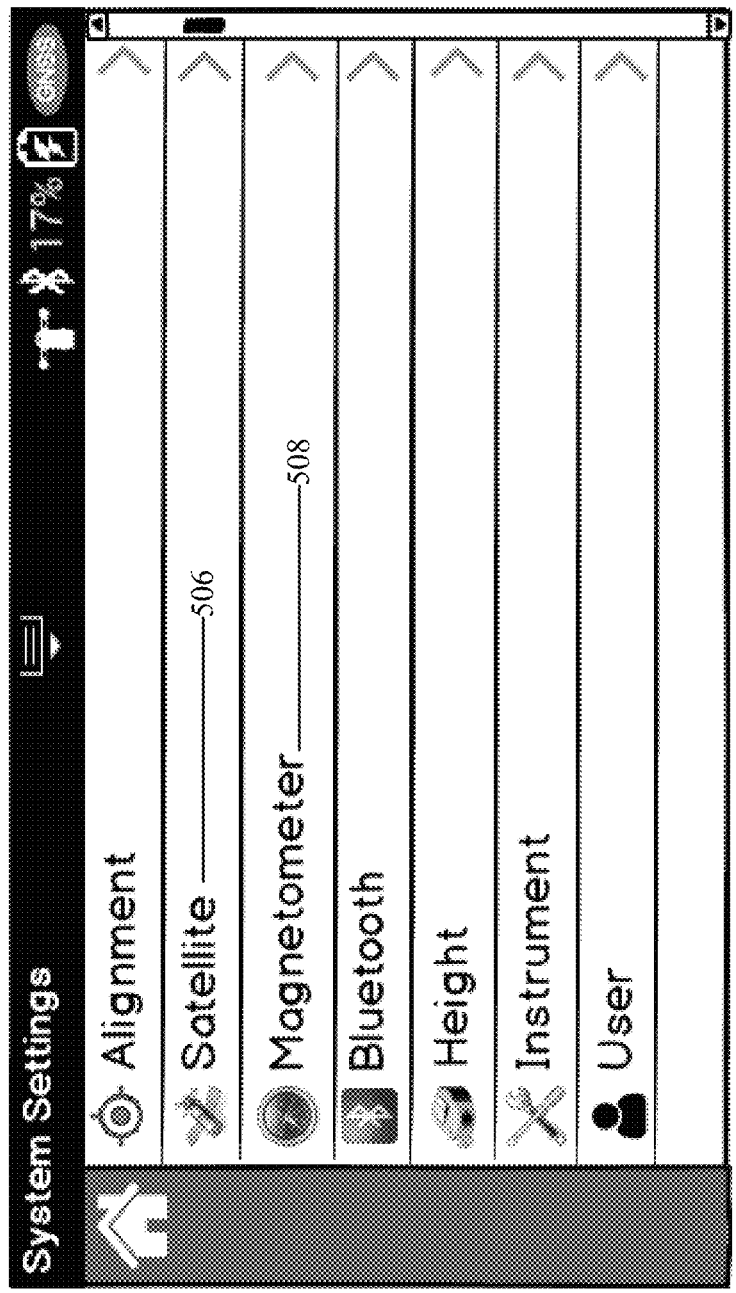
Figure 5C:
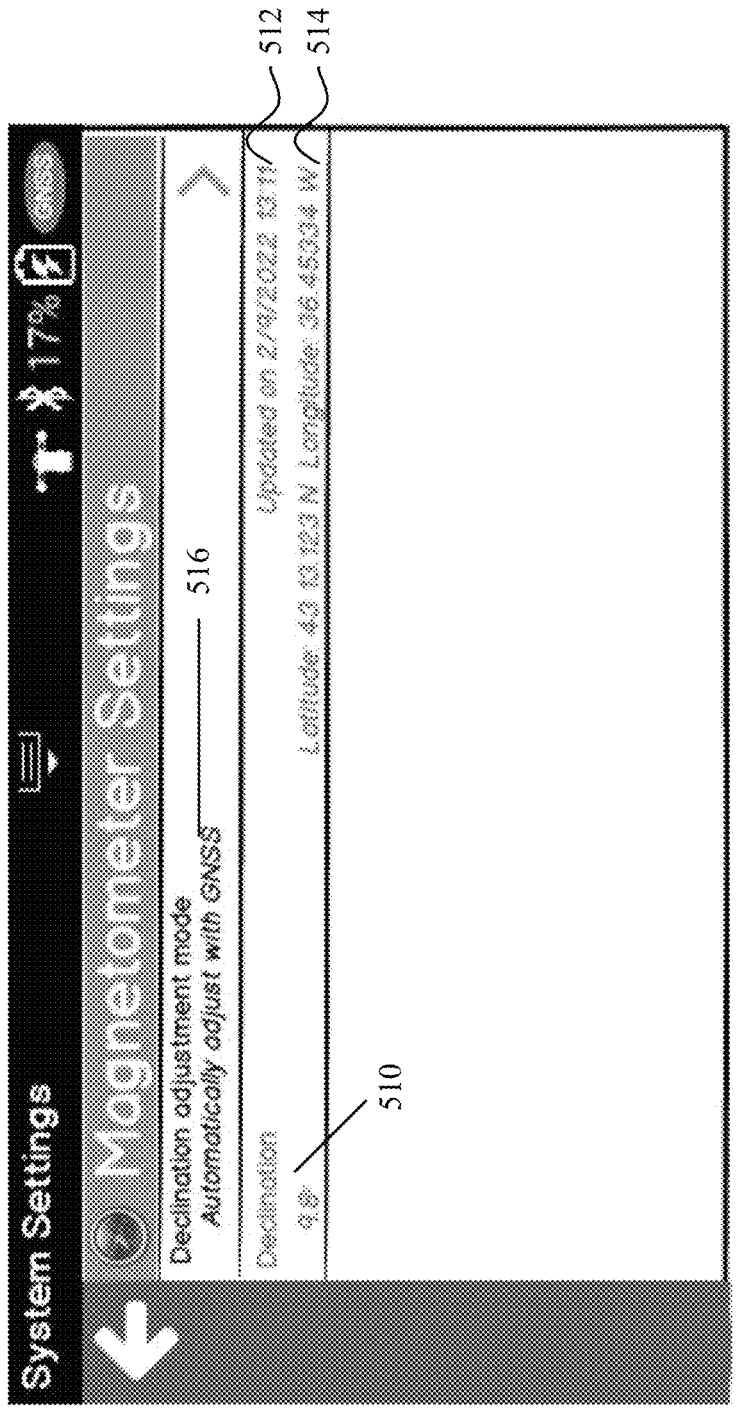

FIG. 5B shows another example interface 500b that may allow different types of alignment. As shown, a satellite icon 506 may allow the user to select and or configure a satellite (e.g., GNSS satellite) based alignment. A magnetometer icon 508 may allow the user to select and or configure a magnetometer-based alignment. FIG. 5C shows another example interface 500c that may be generated when the user selects the magnetometer icon 508. The interface 500c particularly shows a stored declination 510, its associated timestamp 512, and the location 514 (as indicated by the latitude-longitude pair). The single stored declination 510 is just an example, and multiple declinations may be stored in association with their corresponding timestamps and or locations. Out of the multiple stored declinations, the antenna aligner may select a temporally appropriate (e.g., the most recent) and spatially appropriate (e.g., at the current latitude-longitude) declination.

Figure 5D:
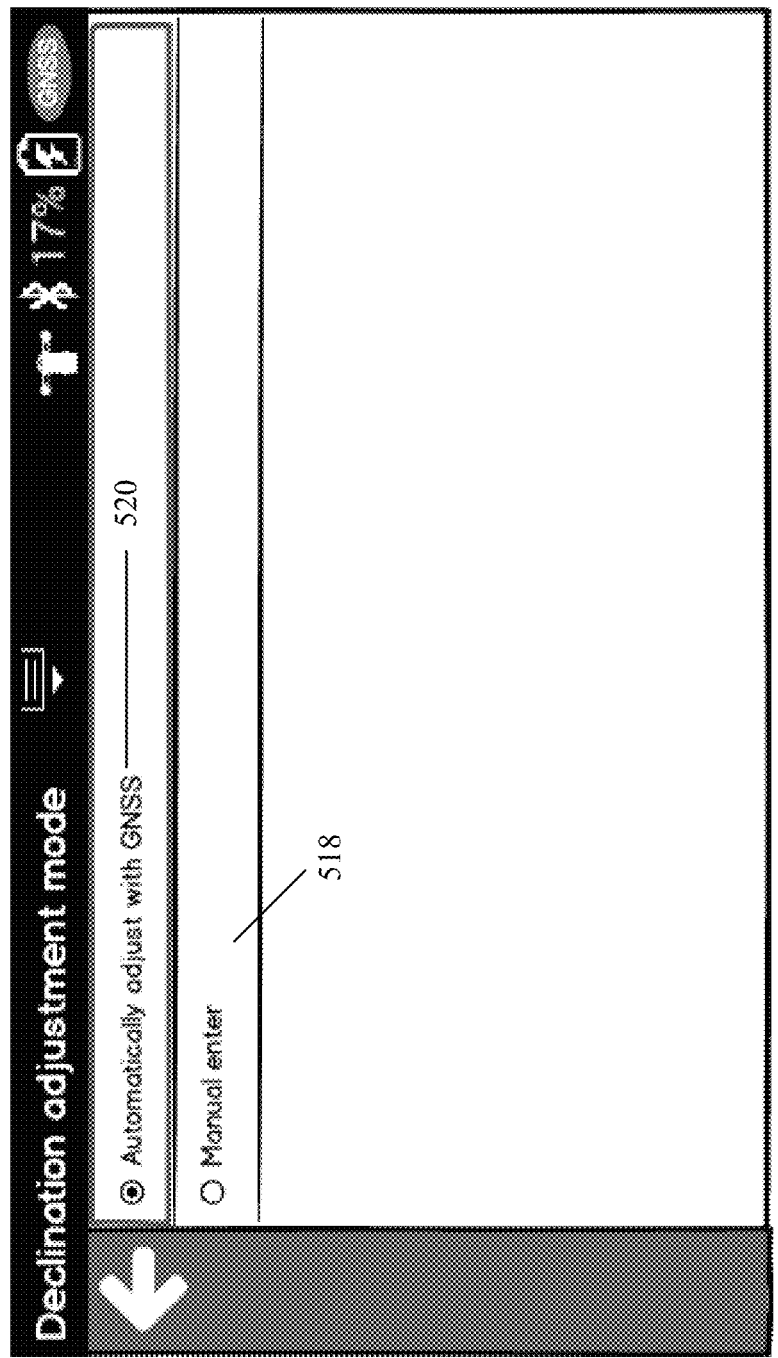

An option 516 may allow the user to select between a manual adjustment and an automatic adjustment (using GNSS geolocation) of a magnetic field sensor based azimuth. FIG. 5D shows a selection interface 500d between an automatic GNSS based adjustment 520 and a manual entry 518. The manual entry 518 may still allow the user to add a map-based declination and or declination calculated/generated using other sources.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. An antenna alignment device configured to be coupled to an antenna, the antenna alignment device comprising:
one or more magnetic field sensors configured to measure earth's magnetic fields at corresponding locations of the one or more magnetic field sensors;
one or more global navigation satellite system (GNSS) antennas configured to receive signals from GNSS satellites and to calculate corresponding geolocations based on corresponding received signals;
a processor configured to:
determine a magnetic azimuth of the antenna based on the measured earth's magnetic field by at least one magnetic field sensor of the one or more magnetic field sensors;
determine a geographic azimuth of the antenna based on the corresponding geolocations; and
determine a declination between the magnetic azimuth and the geographic azimuth; and
a non-transitory storage medium configured to store the determined declination.

2. The antenna alignment device of claim 1, wherein the processor is further configured to:
determine an updated magnetic azimuth based on another measurement of earth's magnetic field by at least one magnetic field sensor of the one or more magnetic field sensors; and
apply the stored declination to the updated magnetic azimuth to determine an updated geographic azimuth of the antenna.

3. The antenna alignment device of claim 2, wherein the processor is configured to apply the stored declination to the updated magnetic azimuth to determine the updated geographic azimuth of the antenna in response to determining that GNSS-based geolocation calculations are unavailable.

4. The antenna alignment device of claim 1, wherein the processor is further configured to:
store, via the non-transitory storage medium, the declination in association with a time of the determination of the declination.

5. The antenna alignment device of claim 4, wherein:
the non-transitory storage medium is further configured to store a plurality of declinations in association with a corresponding plurality of times of determination of the declinations; and
the processor is further configured to:
determine an updated magnetic azimuth based on another measurement of earth's magnetic field by at least one magnetic field sensor of the one or more magnetic field sensors; and
apply the most recent declination of the stored plurality of declinations to determine an updated geographic azimuth of the antenna.

6. The antenna alignment device of claim 1, wherein the processor is further configured to:
store, via the non-transitory storage medium, the declination with a latitude and longitude of a location of the determination of the declination.

7. The antenna alignment device of claim 6, wherein:
the non-transitory storage medium is further configured to store a plurality of declinations in association with a corresponding plurality of latitudes and longitudes of corresponding locations of the determination of the declinations; and
the processor is further configured to:
determine an updated magnetic azimuth based on another measurement, at a particular location, of earth's magnetic field by at least one magnetic field sensor of the one or more magnetic field sensors; and
apply the declination associated with a latitude and longitude of the particular location to determine an updated geographic azimuth of the antenna.

8. The antenna alignment device of claim 1, wherein the processor is further configured to:
determine an updated magnetic azimuth based on another measurement of earth's magnetic field by at least one magnetic field sensor of the one or more magnetic field sensors;

determine an updated geographic azimuth of the antenna based on updated geolocations calculated by the GNSS antennas; and determine an updated declination based on the updated magnetic azimuth and the updated geographic azimuth.

9. The antenna alignment device of claim 1, further comprising a user interface configured to display the determined declination.

10. The antenna alignment device of claim 9, wherein the user interface is further configured to:

prompt a user to select the determined declination or manually enter a declination.

11. An antenna alignment method comprising:

measuring, by one or more magnetic field sensors of an antenna alignment device, earth's magnetic fields at corresponding locations of the one or more magnetic field sensors;

receiving, by one or more global navigation satellite system (GNSS) antennas of the antenna alignment device, signals from GNSS satellites, the GNSS antennas further calculating corresponding geolocations based on corresponding received signals;

determining, by a processor of the antenna alignment device:

a magnetic azimuth of the antenna based on the measured earth's magnetic field by at least one magnetic field sensor of the one or more magnetic field sensors;

a geographic azimuth of the antenna based on the corresponding geolocations; and a declination between the magnetic azimuth and the geographic azimuth; and storing, by a non-transitory storage medium of the antenna alignment device, the determined declination.

12. The antenna alignment method of claim 11, further comprising:

determining, by the processor, an updated magnetic azimuth based on another measurement of earth's magnetic field by at least one magnetic field sensor of the one or more magnetic field sensors; and applying, by the processor, the stored declination to the updated magnetic azimuth to determine an updated geographic azimuth of the antenna.

13. The antenna alignment method of claim 12, further comprising:

applying, by the processor, the stored declination to the updated magnetic azimuth to determine the updated geographic azimuth of the antenna in response to determining that GNSS-based geolocation calculations are unavailable.

14. The antenna alignment method of claim 11, further comprising:

storing the declination in association with a time of the determination of the declination in the non-transitory storage medium.

15. The antenna alignment method of claim 14, further comprising:

storing a plurality of declinations in association with a corresponding plurality of times of determination of the declinations in the non-transitory storage medium;

determining, by the processor, an updated magnetic azimuth based on another measurement of earth's magnetic field by at least one magnetic field sensor of the one or more magnetic field sensors; and applying, by the processor, the most recent declination of the stored plurality of declinations to determine an updated geographic azimuth of the antenna.

16. The antenna alignment method of claim 11, further comprising:

storing the declination with a latitude and longitude of a location of the determination of the declination in the non-transitory storage medium.

17. The antenna alignment method of claim 16, further comprising:

storing a plurality of declinations in association with a corresponding plurality of latitudes and longitudes of corresponding locations of the determination of the declinations in the non-transitory storage medium;

determining, by the processor, an updated magnetic azimuth based on another measurement, at a particular location, of earth's magnetic field by at least one magnetic field sensor of the one or more magnetic field sensors; and applying, by the processor, the declination associated with a latitude and longitude of the particular location to determine an updated geographic azimuth of the antenna.

18. The antenna alignment method of claim 11, further comprising:

determining, by the processor, an updated magnetic azimuth based on another measurement of earth's magnetic field by at least one magnetic field sensor of the one or more magnetic field sensors;

determining, by the processor, an updated geographic azimuth of the antenna based on updated geolocations calculated by the GNSS antennas; and determining, by the processor, an updated declination based on the updated magnetic azimuth and the updated geographic azimuth.

19. The antenna alignment method of claim 11, further comprising:

displaying, by a user interface of the antenna alignment device, the determined declination.

20. The antenna alignment method of claim 19, further comprising:

prompting, on the user interface, a user to select the determined declination or manually enter a declination.

* * * * *